United States Patent
Duits et al.

(10) Patent No.: US 8,453,530 B2
(45) Date of Patent: Jun. 4, 2013

(54) LINEAR ACTUATOR

(75) Inventors: Johannes Andrianus Maria Duits, Bodegraven (NL); Patric Eberle, Hersberg (CH)

(73) Assignee: Aktiebolaget SKF, Göteborg (SE)

( * ) Notice: Subject to any disclaimer, the term of this patent is extended or adjusted under 35 U.S.C. 154(b) by 448 days.

(21) Appl. No.: 12/452,966

(22) PCT Filed: Aug. 1, 2007

(86) PCT No.: PCT/EP2007/006809
§ 371 (c)(1),
(2), (4) Date: May 3, 2010

(87) PCT Pub. No.: WO2009/015676
PCT Pub. Date: Feb. 5, 2009

(65) Prior Publication Data
US 2010/0206103 A1    Aug. 19, 2010

(51) Int. Cl.
*F16H 3/06* (2006.01)
*F16H 27/02* (2006.01)
*F16C 29/02* (2006.01)
*F16C 1/24* (2006.01)

(52) U.S. Cl.
USPC ............. 74/89.23; 74/424.91; 74/424.82

(58) Field of Classification Search
USPC ............ 74/89.23, 424.82, 424.79, 424.91, 74/424.72
See application file for complete search history.

(56) References Cited

U.S. PATENT DOCUMENTS

| | | | | | |
|---|---|---|---|---|---|
| 790,990 | A | * | 5/1905 | White | 74/424.79 |
| 1,123,731 | A | * | 1/1915 | Griffith | 74/424.79 |
| 2,307,317 | A | * | 1/1943 | Konig | 74/89.23 |
| 2,446,393 | A | * | 8/1948 | Russell | 318/675 |
| 2,659,241 | A | * | 11/1953 | Holman | 74/424.72 |
| 4,598,238 | A | * | 7/1986 | Scarano | 318/282 |
| 5,491,372 | A | | 2/1996 | Erhart | |
| 6,453,761 | B1 | | 9/2002 | Babinski | |
| 2006/0117888 | A1 | * | 6/2006 | Tsubono et al. | 74/424.91 |
| 2008/0127757 | A1 | * | 6/2008 | Eberlein et al. | 74/25 |
| 2009/0165581 | A1 | * | 7/2009 | Koyagi et al. | 74/89.23 |
| 2010/0192713 | A1 | * | 8/2010 | Duits et al. | 74/89.23 |

FOREIGN PATENT DOCUMENTS

| EP | 0896855 A | 2/1999 |
|---|---|---|
| WO | WO0044602 A | 8/2000 |
| WO | WO2005/122366 | * 12/2005 |

* cited by examiner

*Primary Examiner* — Justin Krause
(74) *Attorney, Agent, or Firm* — Mark A. Ussai; Bryan Peckjian

(57) ABSTRACT

Linear actuator device, comprising a housing (2), an externally threaded screw (5) mounted to a piston (9), an internally threaded extended nut (7) and a motor (16) comprising a stator (33) and a rotor element (30) positioned around the extended nut (7), wherein a plurality of first magnets (31) of the rotor element (30) are positioned in relation to the stator (33) such that the stator (33) lies between the extended nut (7) and the first magnets (31) of the rotor element (30). The advantage of the invention is that linear actuators with a high energy density can be manufactured in an easy and cost-effective manner.

15 Claims, 1 Drawing Sheet

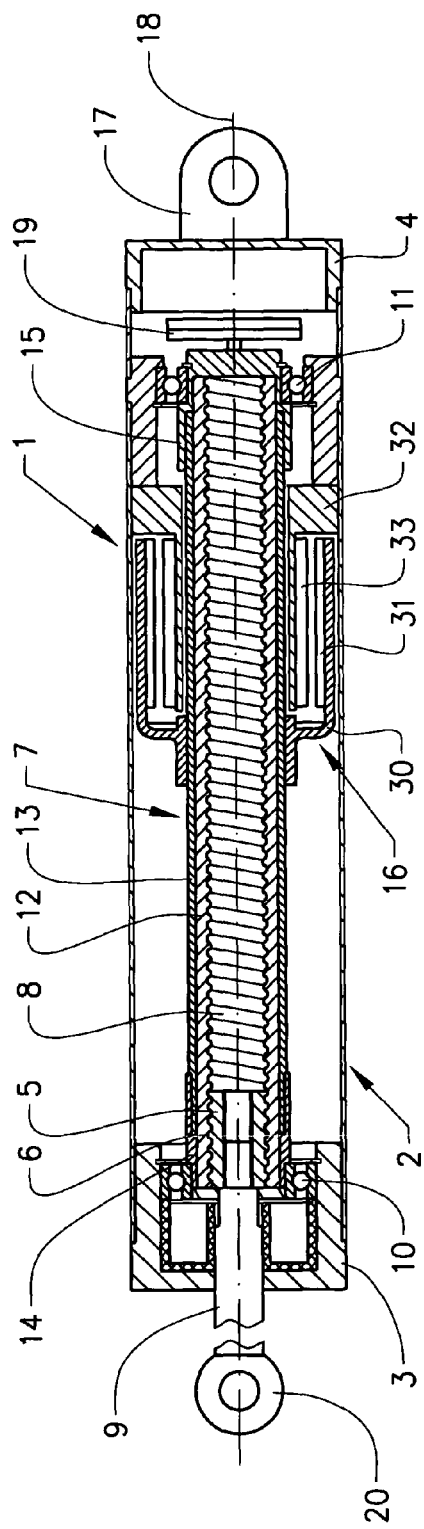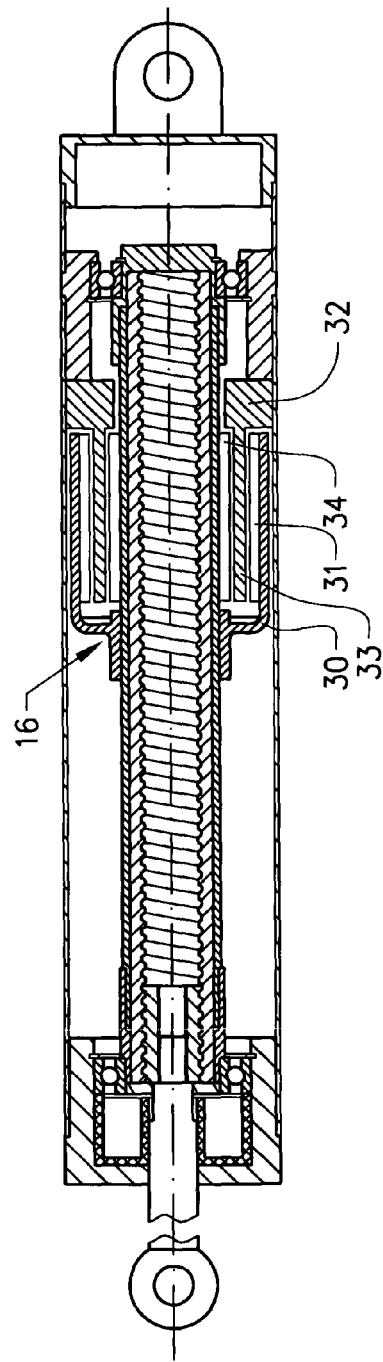

LINEAR ACTUATOR

TECHNICAL FIELD

The present invention relates to a linear actuator device and is more particularly directed towards its electrical drive means.

BACKGROUND ART

Linear actuators are used to move an object along a straight line, either between two end points or to a defined position. Actuators may be air or hydraulically driven using pressure or they may be driven by electricity. Air or hydraulically driven actuators are cheap and simple in design. They are also easy to control, but they require an air or hydraulic supply which is relatively expensive, especially for small systems.

Electrically driven linear actuators normally incorporate a rotating motor and some kind of transmission means to convert the relatively high-speed rotation of the motor to a low speed linear motion. This transmission means may incorporate a gear box and/or a screw shaft. One common type of linear actuator incorporates a screw shaft with a nut running thereon. The screw shaft extends over the full length of the actuator and sets the operating length of the actuator. Since the nut is held in a non-rotatable state, the nut will be displaced when the screw shaft is rotated by a motor. The nut may incorporate rolling elements, such as balls or rollers, between the screw shaft and the nut. This will allow for a high efficiency actuator with high load transfer and long life. The nut may also engage directly with the screw shaft, i.e. a sliding screw design. In this case, the nut is preferably made of a plastic material.

Another type of linear actuator is known from U.S. Pat. No. 5,491,372. Here, a linear actuator is described, in which a circumferential motor drives an elongated cylinder with an internally threaded bore. An actuator assembly provided with an output shaft and a plurality of transmission rollers is retracted or extended by the rotation of the elongated cylinder. The magnets of the motor are attached to the elongated cylinder and the stator of the motor is attached to the housing, encircling the magnets.

Even though this type of linear actuator may work for some specifications, it is relatively expensive and complicated. There is thus room for improvements.

DISCLOSURE OF INVENTION

An object of the invention is therefore to provide an improved linear actuator with a high energy density that is easy and cost-effective to produce.

With a linear actuator device, comprising a housing, an externally threaded screw mounted to a piston, an internally threaded extended nut and a motor, said motor comprising a motor element fixedly attached to the housing and a rotor element fixedly attached to the extended nut, wherein said motor element comprises a stator positioned around the extended nut and further comprises a plurality of coils, and wherein said rotor element comprises a plurality of first magnets, the object of the invention is achieved in that the first magnets of the rotor element are positioned in relation to the stator such that the stator lies between the extended nut and the first magnets of the rotor element.

By this first embodiment of the linear actuator device according to the invention, a linear actuator with a high energy density which is relatively easy and cost-effective to produce is provided. This is partly due to the fact that a sliding screw can be used. This is advantageous in that a linear actuator that is compact can be obtained.

In an advantageous development of the invention, the rotor element of the motor further comprises a plurality of second magnets positioned between the extended nut and the stator. This allows for an improved linear actuator with an even higher energy density.

In an advantageous development of the invention, the screw comprises balls or rollers. The advantage of this is that the friction and thus the wear is reduced. This will also reduce the power loss. The linear actuator is thus further improved.

In another advantageous development of the invention, the extended nut comprises an internally threaded tube. The internally threaded tube is made from a plastic material, which is cost-effective to produce and will also allow the use of a sliding screw, which will reduce the cost further. The weight of the extended nut will also be reduced since the main part of the extended nut, i.e. the internally threaded tube, will be made of a plastic material that is surrounded by a thin support sleeve of e.g. metal.

In an advantageous further development of the invention, the internally threaded tube comprises a plurality of elongated segments. This is advantageous in that an internally threaded tube of any length can be produced by assembling a required number of elongated segments. In this way, linear actuators of different lengths can be obtained in a cost-effective manner In an advantageous further development of the invention, the linear actuator device comprises a rotational sensor for measuring of the rotations of the extended nut. This is advantageous in that the linear actuator can be controlled in an improved way by an electronic control unit.

BRIEF DESCRIPTION OF DRAWINGS

The invention will be described in greater detail in the following, with reference to the embodiments that are shown in the attached drawings, in which FIG. 1 shows a first embodiment in cut view of a linear actuator according to the invention, FIG. 2 shows a second embodiment in cut view of a linear actuator according to the invention,

MODES FOR CARRYING OUT THE INVENTION

The embodiments of the invention with further developments described in the following are to be regarded only as examples and are in no way to limit the scope of the protection provided by the patent claims.

FIG. 1 shows a first embodiment of a linear actuator device according to the invention. The linear actuator 1 comprises a housing 2 with a front end part 3 and a rear end part 4. Inside the housing, a screw 5 having an external thread 6 runs in an extended nut 7 having an internal thread 8. The housing 2 of the linear actuator 1 is symmetrical around a centre axis 18. A piston rod 9 is at its inner end fixedly attached to the screw. The piston rod 9 is provided with a front attachment means 20, e.g. a hole, a thread, fork ear or a single ear, at its outer end. The extended nut 7 comprises an internally threaded tube 12, an outer support sleeve 13, a first end cap 14 and a second end cap 15. The extended nut is mounted to the housing in a rotatable way by means of a front bearing device 10 and a rear bearing device 11. In this embodiment, roller bearings are used as bearing devices to obtain a long service life and a reliable function. Other bearing devices are possible to use, depending on e.g. required durability and precision. The front bearing device 10 is mounted to the first end cap 14 of the extended nut and the rear bearing device 11 is mounted to the second end cap 15 of the extended nut. In this way, the extended nut can rotate freely inside the housing.

When the linear actuator is to be used, it will be mounted to a rigid member, e.g. the chassis of a machine, using a rear attachment means 17, e.g. fork ear or a single ear. The part to be actuated is mounted to the front attachment means 20 on the piston rod in a non-rotatable way. This means that the piston rod will not be able to rotate around the centre axis of the linear actuator. Since the piston rod will not rotate, the screw will be driven along the extended nut when the extended nut rotates. In this way, the piston rod will extend out of or retract into the housing, depending on the rotational direction of the extended nut.

The screw 5 is in this example a friction screw with an external thread. The length of the screw depends on e.g. the load that the linear actuator is designed for. A longer screw will be able to transfer a larger load to the internally threaded tube, but will also exhibit a larger friction. In a further embodiment, the screw may also be of an external ball or roller screw type. Using one of these screw types reduces friction. The operating speed of the piston rod, and thus of the linear actuator, will depend of the speed of the motor and the pitch of the thread.

The linear actuator is further provided with an electric motor 16. The motor is, as shown in FIG. 1, mounted on the outside of and around the extended nut. In order to obtain an as high as possible energy density for the motor and thus an as high as possible output power of the motor to drive the actuator, an outer runner motor type is used. The motor comprises a rotor element 30 fixedly mounted on a radially outer surface of the extended nut 7 and comprises a motor element 32 fixedly attached to a radially inner surface of the housing 2. The motor element 32 comprises a stator 33.

In the motor, first magnets 31 of the motor are positioned at the rotor element 30. The stator 33 of the motor is mounted on the motor element 32. The stator 33 comprises the coils of the motor. With the stator fixed in the linear actuator housing 2, the electrical power transfer to the stator coils is simplified. The coils are preferably moulded in plastic with or without a steel core.

In the motor, the first magnets 31 are positioned in relation to the stator 33 such that the stator lies between the extended nut 7 and the first magnets of rotor element 30, i.e. the first magnets are positioned radially outside of the stator. This will allow for more magnets in the motor, and thus for a larger magnetic field, which in turn will increase the power density. By using rare-earth magnets, an efficient motor with high power density is obtained. The number of magnets, i.e. the number of poles of the motor, may be varied depending on the specific requirements. The same applies for the number of stator coils.

The motor is driven by an external control unit. The control unit may be any kind of suitable control unit, such as an analogue or digital control unit. The linear actuator may have a standard PLC compatible I/O-interface using discrete signal lines or may have an integrated standard fieldbus interface. Most commonly, a standard PLC compatible I/O-interface will be used for the communication between the motor and the control unit may. Two signal lines can be used for the commands "actuator out" and "actuator in". These signals may be either low-level, when a separate power connection is provided, or high level, when the signals are used to drive the motor directly. This input signal may also comprise information on the motor speed, i.e. how fast the motor should rotate. Depending on the type of motor, a voltage setting the speed or a modulated signal may be used as input signal.

The linear actuator may also comprise two end position switches (not shown) that will set the end positions for the piston rod. Most commonly, the end positions are fixed in the linear actuator, and the piston stroke is set by the length of the linear actuator. Alternatively, the end position switches may also be adjustable, so that the piston stroke can be set by the user. The end position switches may be connected to the control unit via two signal control lines, indicating the state of the linear actuator to the control unit. The states are either retracted or extended.

Another way of sensing the state of the linear actuator is to use a current sensing device measuring the current through the motor. When the motor is blocked, i.e. cannot rotate, the current consumption of the motor will increase. This signal can be used to detect the state of the linear actuator, i.e. if the motor is blocked when the piston is in the outmost or inmost position. This detection method is suitable when the drive current and the blocking current for the motor differs enough, e.g. by a factor 2 or more.

In one embodiment of the linear actuator, the linear actuator is provided with a rotational sensor 19, detecting the rotations of the motor. The sensor detects the rotation of the motor and outputs a signal representing a rotational value. The sensor may either output an analogue value, e.g. a voltage proportional to the rotational speed of the motor, or a digital value, either a pulsed signal where the number of pulses is proportional to the rotational speed of the motor or a signal representing an absolute value for the rotation of the motor. The absolute value may either represent a value for the angular position over one turn of the motor or may be an absolute value for the position of the piston over the full stroke length. When a sensor is used that outputs the angular position over one turn, the control unit can count the number of turns in order to calculate the position of the piston. When this type of sensor is used, it is preferred to also incorporate a calibration possibility in the linear actuator, in order to be able to calibrate a starting value for the sensor. This may be e.g. an end position switch. During calibration, the piston is driven until the end position switch is reached, and the control unit starts to count from there.

When an absolute output value is used, it may consist of one part giving an absolute value for the angular position over one turn of the motor and one part representing the number of full turns rotated by the motor. In this case, a calibration possibility is not necessary but is still preferable, in order to be able to calibrate a starting value for the sensor.

The sensor is preferably a contactless rotational sensor, e.g. an optical or magnetic sensor, but also other types of sensors are possible to use, depending on e.g. required resolution, life time expectancy or cost.

In a further embodiment, shown in FIG. 2, the rotating part of the motor further comprises a second set of magnets 34. These second magnets are positioned on the extended nut 7 at the stator 33 of the motor. The motor is thus provided with magnets on both sides of the stator. In this way, a higher magnetic field may be obtained which in turn may increase the energy density of the motor.

The extended nut 7 used in the linear actuator comprises in one embodiment an internally threaded tube 12, an outer support sleeve 13, a first end cap 14 and a second end cap 15. The internally threaded tube 12 consists of a plurality of tube segments assembled together to form the internally threaded tube. The number of tube segments may vary from two segments up to any desired number needed to obtain a required internally threaded tube. Each tube segment is longitudinal, split along the centre axis of the internally threaded tube. Each segment will thus form an arcuate sector of e.g. 180°, 120° or 90° etc.

Preferably, the segments are designed in such a way that they are identical and can thus be produced in the same tool. The segments are preferably made of a plastic material. The plastic material is chosen to meet the requirements of the linear actuator. These requirements may include wear, friction, cost etc. The segments are preferably manufactured in an injection moulding process.

The internally threaded tube is inserted into a support sleeve 13 when it is assembled. The purpose of the support sleeve is to support the internally threaded tube in the radial direction, so that it will not be pushed apart. The support sleeve should therefore be strong enough to hold the internally threaded tube together for at least the rated load of the linear actuator. Thus, the support sleeve is preferably made of a metallic material or a reinforced composite material.

The internally threaded tube may comprise a longitudinal groove along the entire length of the internally threaded tube, in order to prevent pressure build up in the thread when the screw is run inside the internally threaded tube. A possible pressure build up is likely to occur especially when the extended nut is provided with sealing means in order to seal of the extended nut. By sealing the extended nut, it will be possible to apply a lubricant, e.g. oil or grease, in the internally threaded tube. This will allow for a permanently lubricated linear actuator. With a sealed extended nut, the groove will allow the lubrication to move from one end of the internally threaded tube to the other when the piston and thus the screw is extended or retracted.

It is also possible to provide an external groove in the outer surface of the internally threaded tube which will, when inserted into the support sleeve, form a channel in the extended nut that can replace the internal groove. This may be advantageous when an internal thread with no groove is required, e.g. when a ball or roller screw is to be used. When such a thread is used, a connection channel between the thread and the external groove is required.

In a second embodiment, the extended nut 7 is an internally threaded tube made of a plastic material or of a metal, which is threaded in a conventional way using a thread cutting device.

The invention is not to be regarded as being limited to the embodiments described above, a number of additional variants and modifications being possible within the scope of the subsequent patent claims.

REFERENCE SIGNS

1: Linear actuator device
2: Housing
3: Front end part
4: Rear end part
5: Screw
6: External screw thread
7: Extended nut
8: Internal thread
9: Piston rod
10: Front bearing
11: Rear bearing
12: Threaded tube
13: Support sleeve
14: First end cap
15: Second end cap
16: Motor
17: Rear attachment means
18: Centre axis
19: Rotational sensor
20: Front attachment means
30: Rotor element
31: First magnets
32: Motor element
33: Stator
34: Second magnets

The invention claimed is:

1. A linear actuator device comprising:
a housing having a center axis;
an internally threaded extended nut located within the housing and having the center axis, wherein the internally threaded extended nut is configured to rotate within the housing around the center axis;
an electric motor located within the housing, wherein the electric motor includes a motor element, a stator, a rotor, a first set of magnets, a second set of magnets, and coils, wherein the motor element is attached to an interior of the housing, wherein the stator extends from the motor element in direction of the center axis, wherein the coils are wrapped around the stator, wherein the stator and the coils extend along a portion of the internally threaded extended nut, wherein neither the stator nor the coils are in communication with the internally threaded extended nut, wherein the rotor is connected to an exterior of the internally threaded extended nut and is configured to rotate along with the internally threaded extended nut, wherein the first set of magnets are connected to the rotor, and wherein the second set of magnets are attached to the internally threaded extended nut; and
an externally threaded screw configured to engage with the internally threaded extended nut.

2. The linear actuator device of claim 1, wherein a configuration of the electric motor includes the stator and the coils located between the internally threaded extended nut and the first set of magnets.

3. The linear actuator device of claim 1, further comprising bearing devices to rotatably mount the internally threaded extended nut within the housing.

4. The linear actuator device of claim 3, wherein the bearing devices are roller bearings.

5. The linear actuator device of claim 1, further comprising a piston connected to the externally threaded screw.

6. The linear actuator device of claim 1, further comprising an attachment means on opposite end of the housing from end that receives the externally threaded screw.

7. The linear actuator device of claim 1, wherein the second set of magnets are positioned between the stator and the internally threaded extended nut.

8. The linear actuator device of claim 1, wherein a configuration of the electric motor includes the stator and the coils located between the first set of magnets and the second set of magnets.

9. The linear actuator device of claim 1, wherein the externally threaded screw is an external ball screw.

10. The linear actuator device of claim 1, wherein the externally threaded screw is a roller screw.

11. The linear actuator device of claim 1, wherein internally threaded extended nut includes a plurality of internally threaded tube segments aligned with and connected to one another and located inside a support sleeve to provide support thereto in a radial direction.

12. The linear actuator device of claim 1, further comprising a rotational sensor configured to determine rotation of the electric motor.

13. The linear actuator device of claim 12, wherein the rotational sensor is a contactless rotational sensor.

14. A linear actuator device comprising:
a housing having a center axis;
an internally threaded extended nut located within the housing, wherein the internally threaded extended nut is configured to be mounted to a first end and a second end of the housing with bearing devices so that the internally threaded extended nut can rotate within the housing around the center axis;
a stator of an electric motor attached to an interior of the housing, wherein the stator extends along a portion of the internally threaded extended nut but is not in communication with the internally threaded extended nut, and wherein coils are wrapped around the stator;
a rotor of the electric motor is connected to an exterior of the internally threaded extended nut and is configured to rotate along with the internally threaded extended nut, wherein a first set of magnets are connected to the rotor, wherein a second set of magnets are attached to an exterior of the internally threaded extended nut, and wherein a configuration of the electric motor includes the stator and the coils located between the internally threaded extended nut and the first set of magnets, the second set of magnets positioned between the stator and the internally threaded extended nut, and the stator and the coils located between the first set of magnets and the second set of magnets;
an externally threaded screw connected to a piston and configured to engage with the internally threaded extended nut at the first end of the housing; and
an attachment means on the second end of the housing.

15. The linear actuator device of claim 14, further comprising
a rotational sensor configured to determine rotation of the electric motor.

* * * * *